Patented July 30, 1935

2,009,821

UNITED STATES PATENT OFFICE 2,009,821

PROCESS FOR THE MANUFACTURE OF AQUEOUS DISPERSIONS OF BITUMINOUS OR OTHER WATER REPELLANT MATERIALS

Augustus George Terrey, Leonard Gowen Gabriel, and John Frederick Thomas Blott, London, England, assignors, by mesne assignments, to The Flintkote Company, New York, N. Y., a corporation of Massachusetts No Drawing. Application October 2, 1931, Serial No. 566,584. In Great Britain October 2, 1930

3 Claims. (Cl. 134—1)

Our invention relates to the manufacture of aqueous dispersions of water-repellant materials, such as bituminous, hydrocarbonaceous or the like materials, hereinafter referred to as bituminous materials, and has as its object to provide a process whereby concentrated aqueous dispersions of such materials can be obtained with a low viscosity and in a fluid, that is to say, pourable state. By the expression "pourable state" we mean that the dispersions will flow for instance from the 2" diameter bunghole of a barrel.

We have ascertained that if in the preparation of aqueous dispersions of bituminous materials the conditions of dispersion are varied so that while a fine dispersion is first obtained with a portion of the total quantity of bitumen to be dispersed and this is followed by a coarse dispersion of the remaining portion, products can be obtained having the aforesaid properties. The lower viscosity thus obtained in dispersions with a relatively very high concentration of the disperse phase may be ascribed to the presence of large and small particles and to the packing effect thereof.

According to our invention the process for the manufacture of fluid concentrated aqueous dispersions of bituminous materials, consists in dispersing a bituminous material in an already formed normal aqueous dispersion of a bituminous or the like material under conditions yielding particles of average sizes which are relatively much larger compared with the average sizes of the dispersed particles of the normal dispersion.

If the disperse phase in the normal dispersion is a bitumen, the same bitumen may be used for the coarse dispersion or a bitumen harder or softer than that used in the normal dispersion may be employed. Heat is applied, if necessary, to the bitumen to render it sufficiently fluid.

In an embodiment of the invention an aqueous dispersion of the originating material, for instance, a bituminous substance, is prepared in a mill such as a so-called Hurrell mill so as to contain for instance 30 to 60 per cent of disperse phase, the said dispersion constituting the aforesaid normal dispersion, and then a further quantity of the originating material, which may be of the same batch as that employed for making the normal dispersion or which may have a different physical character or nature, is dispersed in the normal dispersion in a helical screw paddle mixer until the total content of disperse phase amounts to, for instance, 80 to 85 per cent.

In another embodiment of the invention a solution of soap containing an excess of alkali in an amount sufficient to neutralize exactly the acids present in the bitumen which is to be dispersed, is placed in a mixer capable of turning at from 200 to 400 revolutions per minute and molten bitumen is run in during the mixing until the first normal dispersion is obtained. A further quantity of bitumen in an amount sufficient to give the final concentration in the end product is then added. The addition is made at an increased rate over that used for obtaining the first normal dispersion, or alternatively the rate of mixing is decreased. If desired a combination of both measures may be employed.

The following example illustrates how the process of this invention may be carried into effect:—

A dispersion of 57 parts of Venezuelan asphalt of 200 penetration in 43 parts of 1.5 per cent potassium oleate solution is prepared in a Hurrell mill operating at a peripheral speed of about 10,000 feet per minute. The temperature of the asphalt is 140° C., while that of the soap solution is 35° C. This normal dispersion at a temperature of 40° C. is introduced into a helical screw paddle mixer operating at about 30 revolutions per minute, and molten asphalt at 125° C. is gradually introduced till the bitumen content reaches 85%. The product is fluid when cold and will flow from the 2" diameter bunghole of a barrel. The coarsely dispersed particles average over 20 to 30 micron in diameter as compared with an average of 2 micron which represents the diameter of the dispersed particles in the normal dispersion.

We claim:

1. A process for the manufacture of aqueous dispersions of bituminous materials which comprises first making a dispersion of the bituminous material in water, said dispersion containing 30 to 60% of bituminous material as the disperse phase, and the dispersed particles being of an average size of about 2 micron, dispersing further quantities of bituminous material into the thus formed dispersions, regulating the rate of dispersion of said additional quantities of bituminous material so that said quantities become dispersed in particles of an average size of the order of 20 to 30 micron, and continuing the dispersion of said additional quantities until there is produced a dispersion of 80 to 85% bitumen content and having a viscosity sufficiently low to permit the product to flow from a 2" diameter bung hole of a barrel.

2. A process for the manufacture of aqueous dispersions of bituminous materials which consists in preparing an aqueous dispersion of a bituminous material, the bitumen content of said dispersion being from 30 to 60% by weight thereof and the dispersed particles being of an average size of about 2 micron, dispersing a further quantity of bituminous material in an amount sufficient to give a final bitumen content of the order of 80 to 85% by weight of the product and regulating the rate of dispersion of said additional quantities so that the same become dispersed in particles of an average size of the order of 20 to 30 micron, the final product having a viscosity sufficiently low to permit the same to flow from a 2" diameter bung hole of a barrel.

3. An aqueous dispersion of bituminous material having 80 to 85% total bitumen content by weight, the major portion of said bitumen content being composed of dispersed particles of an average size of about 2 micron and the balance of said bitumen content being composed of dispersed particles of an average size of the order of 20 to 30 micron, said dispersion having a viscosity sufficiently low to permit the same to flow from a 2" diameter bung hole of a barrel.

AUGUSTUS GEORGE TERREY.
LEONARD GOWEN GABRIEL.
JOHN FREDERICK THOMAS BLOTT.